(12) United States Patent
Anderson et al.

(10) Patent No.: US 10,112,425 B2
(45) Date of Patent: *Oct. 30, 2018

(54) AUTHENTICATION VALUE FOR A FLUID EJECTION DEVICE

(71) Applicant: HEWLETT-PACKARD DEVELOPMENT COMPANY, L.P., Houston, TX (US)

(72) Inventors: Daryl E. Anderson, Corvallis, OR (US); Huston W. Rice, Vancouver, WA (US); Eric T. Martin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/822,325

(22) Filed: Nov. 27, 2017

(65) Prior Publication Data

US 2018/0086122 A1    Mar. 29, 2018

Related U.S. Application Data

(63) Continuation of application No. 15/453,614, filed on Mar. 8, 2017, now Pat. No. 9,855,777, which is a continuation of application No. 15/029,555, filed as application No. PCT/US2013/065038 on Oct. 15, 2013, now Pat. No. 9,630,400.

(51) Int. Cl.
*B41J 2/045* (2006.01)
*B41J 29/38* (2006.01)
*G06F 21/62* (2013.01)

(52) U.S. Cl.
CPC ............ *B41J 29/38* (2013.01); *B41J 2/0458* (2013.01); *B41J 2/04535* (2013.01); *B41J 2/04565* (2013.01); *B41J 2/04586* (2013.01); *G06F 21/62* (2013.01); *B41J 2202/17* (2013.01)

(58) Field of Classification Search
CPC .. B41J 2/04535; B41J 2/04565; B41J 2/0458; B41J 2/04586; B41J 2202/17; G06F 21/62
See application file for complete search history.

(56) References Cited

U.S. PATENT DOCUMENTS

| 4,872,027 | A | 10/1989 | Buskirk et al. |
| 6,161,916 | A | 12/2000 | Gibson et al. |
| 6,375,309 | B1 | 4/2002 | Taneya et al. |

(Continued)

FOREIGN PATENT DOCUMENTS

| CN | 1480333 | | 3/2004 |
| EP | 0626266 | A2 | 11/1994 |

(Continued)

OTHER PUBLICATIONS

European Patent Office, Transmittal of the International Preliminary Report on Patentability for PCT/US2013/065038 dated Jan. 21, 2016 (18 pages).

(Continued)

*Primary Examiner* — Thinh H Nguyen
(74) *Attorney, Agent, or Firm* — Conley Rose PC

(57) ABSTRACT

A fluid ejection device includes a plurality of analog devices, and a storage element storing an authentication value based on electrical characteristics of a subset of the plurality of analog devices.

13 Claims, 6 Drawing Sheets

(56) References Cited

U.S. PATENT DOCUMENTS

| | | |
|---|---|---|
| 6,538,681 B2 | 3/2003 | Lee |
| 6,837,564 B2 | 1/2005 | Akama et al. |
| 7,234,645 B2 * | 6/2007 | Silverbrook ............... B41J 2/14 |
| | | 235/494 |
| 7,384,113 B2 | 6/2008 | Benjamin et al. |
| 7,453,492 B2 | 11/2008 | Silverbrook |
| 2008/0180474 A1 | 7/2008 | Jeon et al. |

FOREIGN PATENT DOCUMENTS

| | | |
|---|---|---|
| EP | 0855278 | 7/1998 |
| JP | 2005125720 A | 5/2005 |
| WO | WO-02/055310 A1 | 7/2002 |
| WO | WO-2013/048430 A1 | 4/2013 |

OTHER PUBLICATIONS

H. V. Heeren, "MEMS, Recent Developments, Future Directions," Technology Watch, Dec. 11, 2007; Copyright 2007 Loughborough University, 55 p.

PCT Search Report and Written Opinion, dated Jun. 1, 2014, PCT/US2013/065038, Hewlett-Packard Development Company, Ltd., European Patent Office; 11 pages.

* cited by examiner

AUTHENTICATION VALUE FOR A FLUID EJECTION DEVICE

CROSS REFERENCE TO RELATED APPLICATIONS

This is a continuation of U.S. application Ser. No. 15/453,614, filed Mar. 8, 2017, which is a continuation of U.S. application Ser. No. 15/029,555, having a national entry date of Apr. 14, 2016, which is a national stage application under 35 U.S.C. § 371 of PCT/US2013/065038, filed Oct. 15, 2013, which are all hereby incorporated by reference in their entirety.

BACKGROUND

Fluid ejection devices such as print cartridges are used in, for example, printers or other types of fluid dispensing systems to cause fluid to be ejected on to a print or other type of medium to print an image. Verifying the authenticity of the fluid ejection device is advisable.

BRIEF DESCRIPTION OF THE DRAWINGS

For a detailed description of exemplary examples, reference will now be made to the accompanying drawings in which.

DETAILED DESCRIPTION

Reference is made herein to a "fluid ejection device." Such a device may be used in various applications such as in cartridges and printers. The fluid to be ejected by the device may comprise printer ink, toner, clear liquid, or other types of fluid such as fluids for forensic or pharmaceutical applications. In some examples, a fluid ejection device may include a print head die (in some examples referred to as a print head) and may also include a fluid reservoir. In some examples, the die is the result of semiconductor wafer processing and includes at least one semiconductor or electric component. In further examples, the die includes SU8 to facilitate fabrication of at least one component on the die.

The illustrative fluid ejection device described herein includes a storage element for storing an authentication value usable to verify the authenticity of the fluid ejection device. The authentication value stored on the fluid ejection device is generated based on various analog devices that are part of the fluid ejection device. In the examples disclosed below, the analog devices are firing resistors, but can be other than the resistors in other examples. In such examples, the authentication value is generated based on the resistance of various of the firing resistors.

Figure 1:
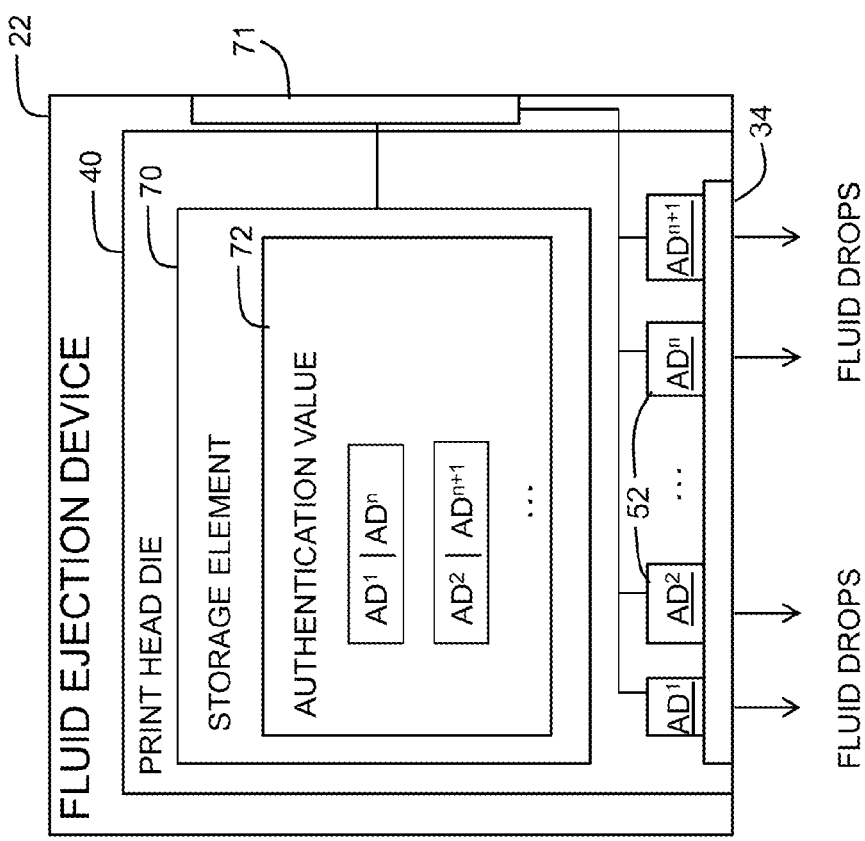
FIG. 1 illustrates an implementation of a fluid ejection device in accordance with various examples.

FIG. 1 shows a fluid ejection device 22 in accordance with one example. The fluid ejection device 22 includes a print head die 40 that ejects drops of fluid through a nozzle array 34 towards a print medium. The nozzle array 34 includes a plurality of individual nozzles. The fluid is provided to nozzle array 34 from a fluid reservoir. In some implementations, the ink reservoir is integrated into the fluid ejection device 22, while in other implementations, the ink reservoir is separate from the fluid ejection device, but connected to the fluid ejection device through a fluidic connection such as a supply tube.

Nozzle array 34 may be arranged in the fluid ejection device 22 such that properly sequenced ejection of fluid from nozzle array 34 causes characters, symbols, and/or graphics or images to be printed on to a print medium as the fluid ejection device 22 and print medium are moved relative to each other. The fluid ejection device 22 may be used as a consumable, and thus a replaceable, component of a printer or other fluid dispensing system.

The fluid ejection device 22 includes analog devices $AD^1$-$A^{n+1}$. In some examples, as described below, each analog device $AD^1$-$A^{n+1}$ comprises a resistor such as a print head die firing resistor. In some examples the firing resistor includes a thermal resistor. In other examples the analog device includes a piezo resistor. The analog devices $AD^1$-$A^{n+1}$ cause drops of fluid to be ejected on to a print medium. The print head die 40 also includes a storage element 70 which stores an authentication value 72. The authentication value 72 is generated based on comparisons $AD^1/AD^n$, $AD^2/AD^{n+1}$ of at least some of the analog devices $AD^1$-$AD^{n+1}$. In some examples, each comparison $AD^1/AD^n$, $AD^2/AD^{n+1}$, etc. is based on a difference between the measured electrical characteristics of a corresponding pair of analog devices $AD^1$ and $AD^2$, $AD^n$ and $AD^{n+1}$, etc. For example, between two analog devices, $AD^1$ and $AD^2$, a logic "1" may indicate that the electrical characteristic of $AD^1$ is greater than the electrical characteristic of $AD^2$, while a logic "0" may indicate that the electrical characteristic for $AD^1$ is less than the electrical characteristic for $AD^2$. In some examples the measured electrical characteristics include a resistance of a firing resistor.

The fluid ejection device 22 also includes an electrical connection 71 through which the authentication value 72 can be provided to and stored in the storage element 70, and subsequently read from the storage element 70 for purposes of, for example, authenticating the fluid ejection device 22. The generation and use of the authentication value is further explained below.

Figure 2:
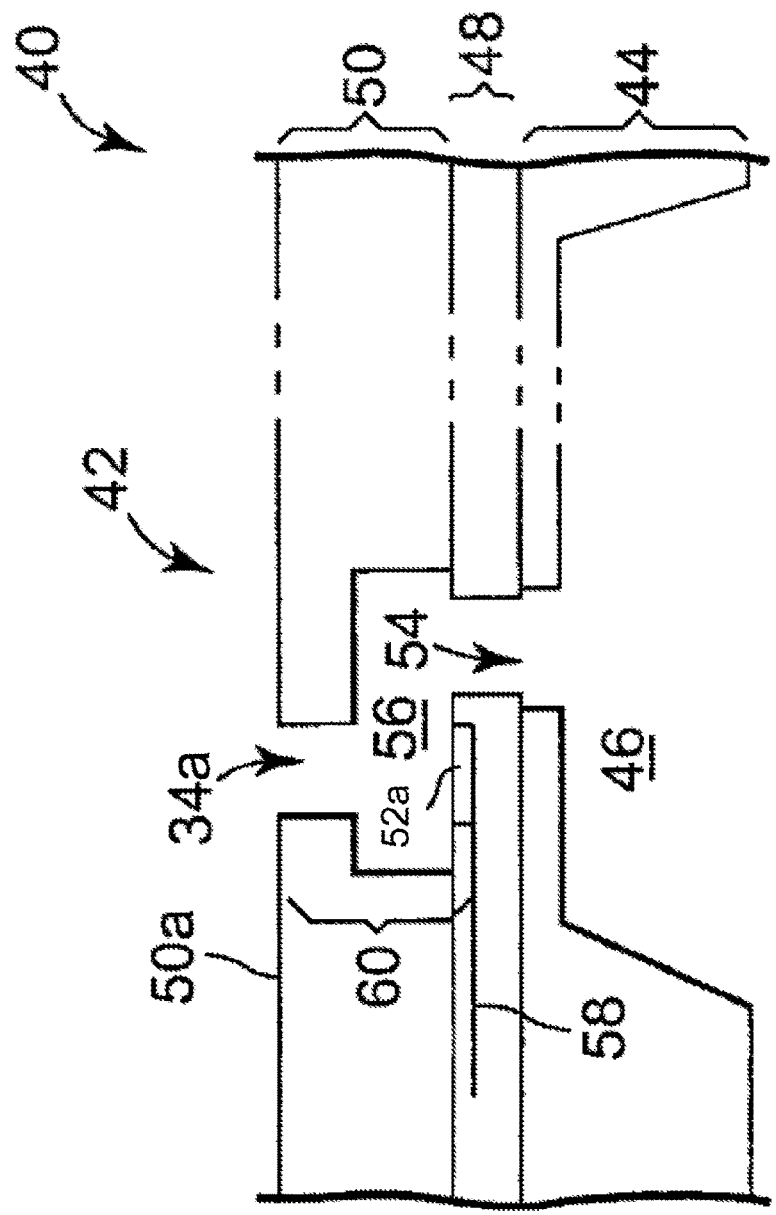
FIG. 2 illustrates a portion of a print head die in accordance with various examples.

FIG. 2 is a diagram illustrating a portion of print head die 40 in accordance with one example. The die may be part of a print head. The print head die 40 may include an array of fluid ejecting elements 42. Fluid ejecting elements 42 may be formed on a substrate 44, 48, 50, which has a fluid feed slot 46 formed therein. As such, fluid feed slot 46 provides a supply of a fluid to fluid ejecting elements 42. Fluid feed slot 46 is one example of a fluid feed source. Other examples of fluid feed sources include corresponding individual fluid feed holes feeding corresponding vaporization chambers and multiple shorter fluid feed trenches that each feed corresponding groups of fluid ejecting elements. A thin-film structure 48 includes a fluid feed channel 54 formed therein which communicates with fluid feed slot 46 formed in substrate 44. An orifice layer 50 has a front face 50a and a nozzle opening 34a formed in front face 50a. Nozzle opening 34a is part of nozzle array 34. Orifice layer 50 also includes a vaporization chamber 56 formed therein which communicates with nozzle opening 34a and fluid feed channel 54 of thin-film structure 48. A firing resistor 52a is positioned within vaporization chamber 56 and leads 58 electrically couple firing resistor 52a to circuitry to control the application of electrical current through selected firing resistors. A drop generator 60 may include firing resistor 52a, vaporization chamber 56 and nozzle opening 34a.

During printing, fluid flows from fluid feed slot 46 to vaporization chamber 56 via fluid feed channel 54. Nozzle opening 34a may be operatively associated with firing resistor 52a such that, upon energizing of firing resistor 52a, droplets of fluid within vaporization chamber 56 are ejected through nozzle opening 34a (e.g., substantially normal to the plane of firing resistor 52a) and toward a print medium.

Figure 3:
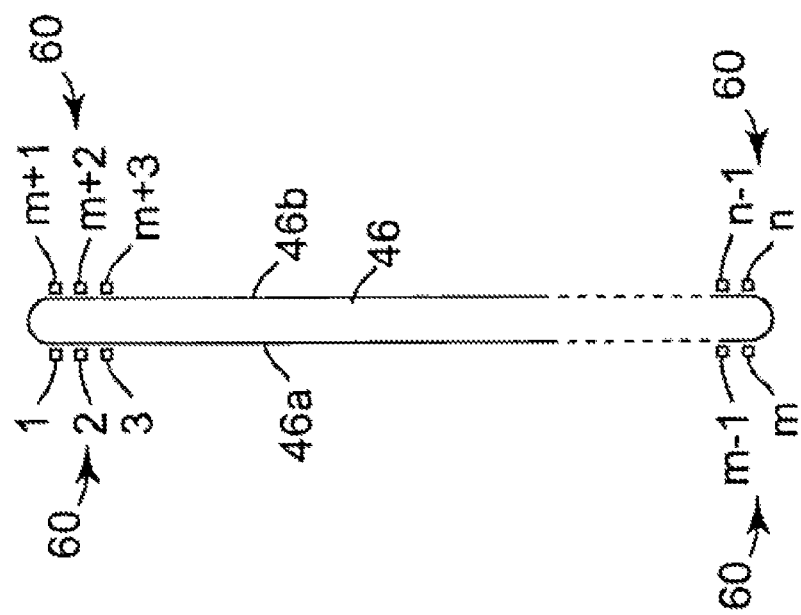
FIG. 3 illustrates multiple drop generators disposed around a fluid feed slot in accordance with various examples.

FIG. 3 is a diagram illustrating drop generators 60 located along fluid feed slot 46 in one example of print head die 40. Fluid feed slot 46 includes opposing fluid feed slot sides 46a and 46b. Drop generators 60 are disposed along each of the opposing ink feed slot sides 46a and 46b. A total of n drop generators 60 are located along fluid feed slot 46, with m drop generators 60 located along fluid feed slot side 46a, and n−m drop generators 60 located along fluid feed slot side 46b. In one example, n is 704, but any suitable number of drop generators 60 may be disposed along fluid feed slot 46.

Fluid feed slot 46 provides fluid to each of the n drop generators 60 disposed along fluid feed slot 46. Each of the n drop generators 60 includes a firing resistor 52a, a vaporization chamber 56 and a nozzle opening 34a. Each of the n vaporization chambers 56 may be fluidically coupled to fluid feed slot 46 through at least one fluid feed channel 54. The firing resistors 52a of drop generators 60 are energized in a controlled sequence to eject fluid from vaporization chambers 56 and through nozzle openings 34a to print an image on a print medium.

Figure 4:
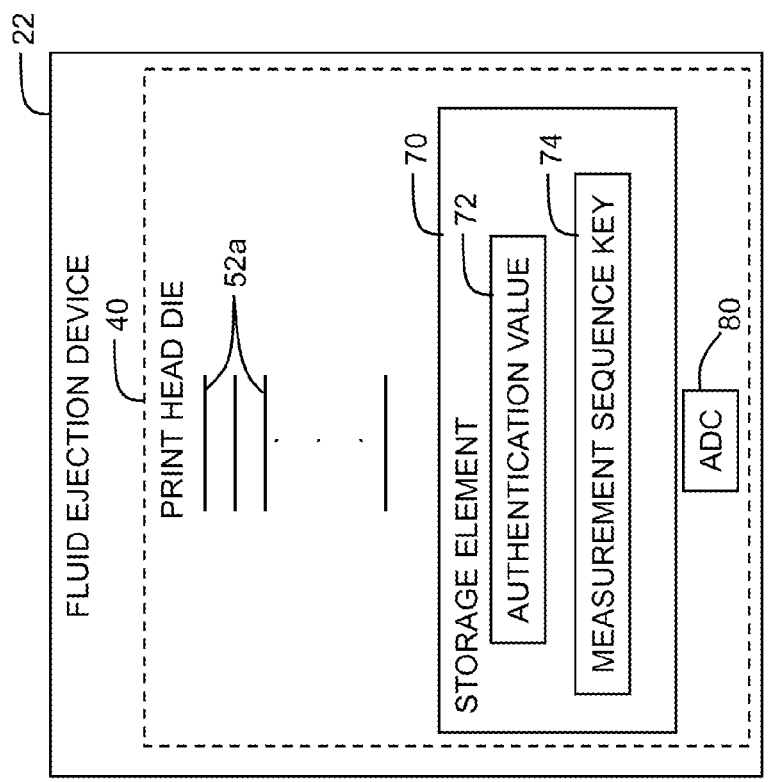
FIG. 4 is a schematic representation of a fluid ejection device in accordance with various examples.

FIG. 4 provides an example of a schematic representation of the fluid ejection device 22. For example, the fluid ejection device 22 includes or is defined by a print head die 40. The fluid ejection device 22 includes a plurality of analog devices such as firing resistors 52a. The fluid ejection device 22 may also include a storage element 70 and an analog-to-digital converter (ADC) 80. The storage element comprises any suitable type of non-transitory, non-volatile storage device. As shown, the storage element 70 may be used to store an authentication value 72 and a measurement sequence key 74. In some examples the resistors 52a, the storage element 70 and the ADC 80 are integral components of the print head die 40.

The authentication value 72 stored on the fluid ejection device 22 may be calculated during manufacturing and assembly of the fluid ejection device 22 based on at least some of the firing resistors 52a. While the firing resistors 52a nominally may have the same resistance, in practice due to manufacturing tolerances, the resistances of the firing resistors 52a are not all identical. A resistance measurement device that has sufficient precision will be able to discern the resistive differences between the various firing resistors 52a. The variability of the resistances is used as a "fingerprint" to generate a unique authentication value for each fluid ejection device 22. The authentication value is stored in the storage element 70 of the fluid ejection device by a host device (e.g., during manufacturing) and may subsequently be used by a printer in which the fluid ejection device 22 is installed to verify the authenticity of the fluid ejection device. For example, the printer may replicate the measurement of the various firing resistors to generate a second authentication value, compare the newly generated second authentication value to the authentication value 72 previously stored in the storage element 70 of the fluid ejection device 22. If the two authentication values match, the fluid ejection device 22 is deemed to be authentic; otherwise, the fluid ejection device 22 is deemed not to be authentic.

In some implementations, the authentication value 72 is based on a comparison of resistances of pairs of firing resistors 52a. For example, between two resistors, R1 and R2, a logic "1" may indicate that the resistance for R1 is greater than the resistance for R2, while a logic "0" may indicate that the resistance for R1 is less than the resistance for R2. Each bit of the authentication value thus may represent the comparison of the measured resistances of a specific pair of firing resistors 52a. If the authentication value is, for example, a 16-bit value, then the comparison of 16 pairs of firing resistors 52a are encoded in the authentication value. The authentication value 72 may also be encrypted.

The ADC 80 may be coupled between the electrical connection 71 (FIG. 1) and the analog devices 52 to facilitate measuring the electrical characteristics of the analog devices. In some examples, the ADC 80 converts the electrical characteristics to a digital form to be stored on the storage element 70 in the form of the authentication value, for example at the manufacturing stage. In further examples the ADC 80 converts the electrical characteristics to a digital form to be read by a fluid dispensing system into which the fluid ejection device 22 is installed, and compared by the fluid dispensing system to the authentication value 72 already stored on the storage element during an authentication process. In some examples, the ADC 80 is an integral component of the die 40 so that it can be used by a connected host device (e.g., equipment at the manufacturing stage to initially sore the authentication value 72 into the fluid ejection device 22 or a fluid dispensing system for authentication of the fluid ejection device) for measuring the electrical characteristics.

Further still, the authentication value 72 initially may be formed as a tristate value with each state indicating a result of a comparison of the electrical characteristics of a pair of firing resistors. One state may indicate that a first firing resistor is greater than a second firing resistor, while a second state may indicate the first firing resistor is less than the second firing resistor. A third state may indicate that the two firing resistors are approximately equal (e.g., within a predetermined range of each other). These tristate values then may be converted to a sequence of binary bits (e.g., a larger binary number) to represent the authentication value 72 stored on the fluid ejection device 22. The conversion of the tristate values to a binary number is a form of encryption, and the binary number may be further encrypted as desired.

Referring still to FIG. 4, the measurement sequence key 74 indicates which firing resistors 52a were measured for the computation of the authentication value 72 stored on the fluid ejection device 22. The measurement sequence key 74 may be used by a fluid dispensing system into which the fluid ejection device 22 is installed to determine which firing resistors were used to generate the authentication value 72 to thereby permit the dispensing system to recreate the same process for computing its own authentication value for authentication of the fluid ejection device 22. The measurement sequence key may be any of multiple different values, each value specifying a specific set of firing resistors to be used in the comparison. The manufacturing equipment that initially generates the authentication value 72 and the fluid dispensing system that receives and authenticates the fluid ejection device 22 are preprogrammed to determine based on the measurement sequence key 74 which specific set of firing resistors are used in the firing resistor resistance comparisons to generate the authentication value.

Figure 5:
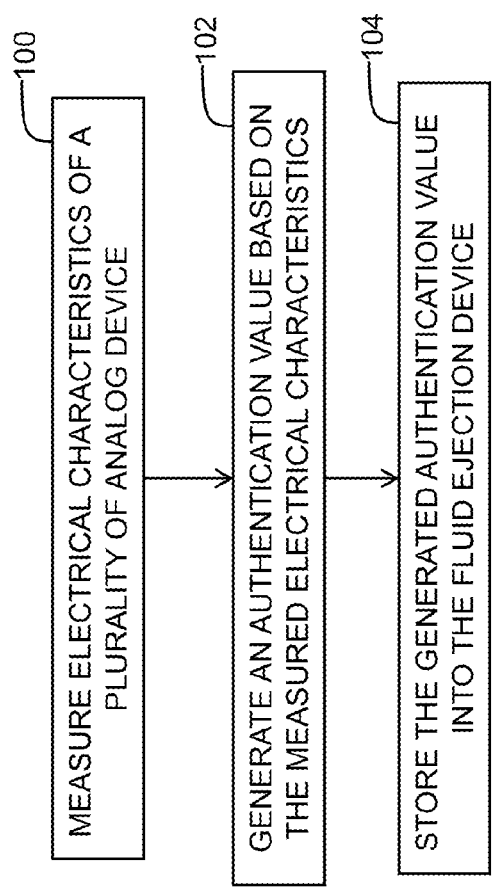
FIG. 5 is a method for generating an authentication value for a fluid ejection device in accordance with various examples.

FIG. 5 illustrates a method for generating the authentication value 72. FIG. 5 (and FIG. 6) refer to "analog devices." In some implementations analog devices are firing resistors. At 100, the method includes measuring the electrical characteristics of a plurality of analog devices (e.g., resistances of firing resistors). The measured electrical characteristics may be converted to digital values by the ADC 80. At 102, the method further includes computing an authentication value based on the measured electrical characteristics. The authentication value may be encrypted. At 104, the method includes storing the generated authentication value on the fluid ejection device 22 (e.g., in the storage element 70). The measurement sequence key 74 may be generated and stored in storage element 70 to indicate which analog devices were used to form the authentication value. At a later stage the fluid ejection device 22 may be connected to, or otherwise installed in, a fluid dispensing system and the electrical characteristics may be measured again, for example again through the ADC 80, and compared to the (decrypted) authentication value to authenticate the fluid ejection device 22.

Figure 6:
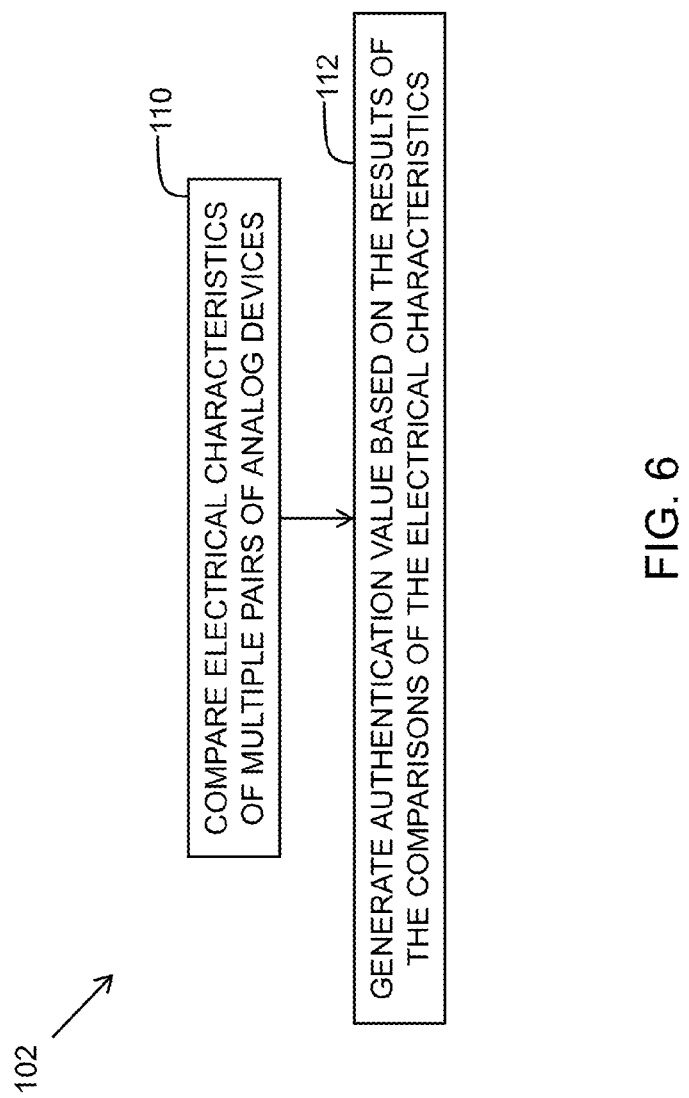
FIG. 6 is a method further elaborating on how the authentication value is generated in accordance with various examples.

FIG. 6 illustrates an implementation of operation 102 from FIG. 5. At 110, electrical characteristics of multiple pairs of analog devices (e.g., resistances of firing resistors) are compared and at 112, the authentication value is generated based on the results of the comparisons of the measured electrical characteristics.

It will be appreciated that numerous variations and/or modifications may be made to the above-described examples, without departing from the broad general scope of the present disclosure. The present examples are, therefore, to be considered in all respects as illustrative and not restrictive.

What is claimed is:

1. A fluid ejection device, comprising:
a plurality of analog devices; and
a storage element storing an authentication value based on electrical characteristics of a subset of the plurality of analog devices, wherein the authentication value stored in the storage element is encrypted.

2. The fluid ejection device of claim 1, wherein the electrical characteristics of the subset of the plurality of analog devices are measurable by a fluid ejection system, and wherein the authentication value is usable by the fluid ejection system to verify an authenticity of the fluid ejection device based on measured values of the subset of the plurality of analog devices.

3. The fluid ejection device of claim 1, wherein the storage element further stores information that indicates the subset of the plurality of analog devices on which the authentication value is based.

4. The fluid ejection device of claim 1, further comprising an electrical connection to connect to a host device, the electrical connection being connected to the storage element to communicate the authentication value to the host device, and being connected to the subset of the plurality of analog devices to facilitate measuring of the electrical characteristics of the subset of the plurality of analog devices by the host device.

5. The fluid ejection device of claim 4, further comprising an analog-to-digital converter coupled between the electrical connection and the subset of the plurality of analog devices to facilitate measuring the electrical characteristics of the subset of the plurality of analog devices.

6. The fluid ejection device of claim 1, wherein the authentication value comprises an encrypted version of a comparison value, the comparison value includes a plurality of bits, a first bit of the plurality of bits based on electrical characteristics of a first subset of analog devices, and a second bit of the plurality of bits based on electrical characteristics of a second subset of analog devices.

7. The fluid ejection device of claim 1, wherein the analog devices comprise resistors, and the electrical characteristics include resistances of the resistors.

8. The fluid ejection device of claim 1, further comprising a connector to communicate the authentication value to a fluid dispensing system as part of an authentication process performed by the fluid dispensing system to authenticate the fluid ejection device based on the authentication value.

9. A die comprising:
a plurality of nozzles and a plurality of corresponding firing elements; and
a storage element storing an authentication value based on electrical characteristics of a subset of the firing elements, and information that indicates which firing elements were measured for a computation of the authentication value.

10. The die of claim 9, further comprising an analog-to-digital converter to convert measured electrical characteristics of the subset of the firing elements to digital values to facilitate measurement by a host device.

11. The die of claim 9, further comprising a connector to communicate the authentication value to a fluid dispensing system as part of authenticating the die by the fluid dispensing system.

12. A die comprising:
a plurality of analog devices; and
a storage element storing an authentication value based on electrical characteristics of a subset of the plurality of analog devices, wherein the authentication value is encrypted.

13. The die of claim 12, wherein encryption to provide the authentication value includes a conversion from a tristate number to a base-2 number.

* * * * *